Figure 9:
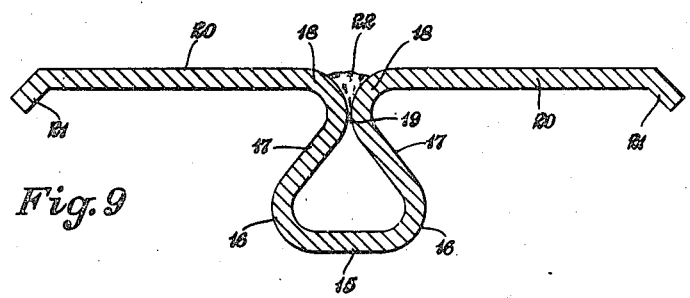

Dec. 28, 1948. S. MACOMBER 2,457,250
TUBULAR SECTION STRUCTURAL MEMBER
Filed May 3, 1948 3 Sheets-Sheet 1
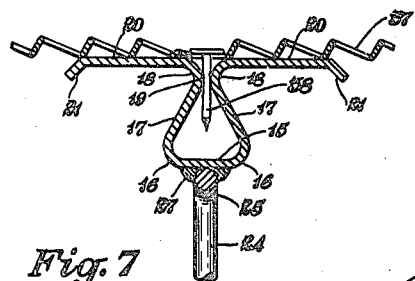
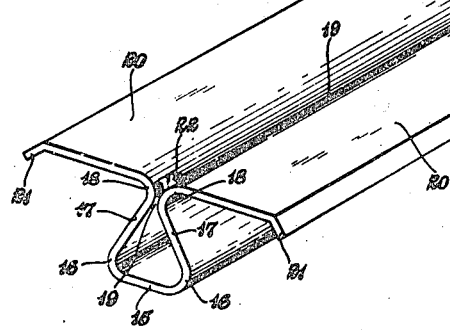
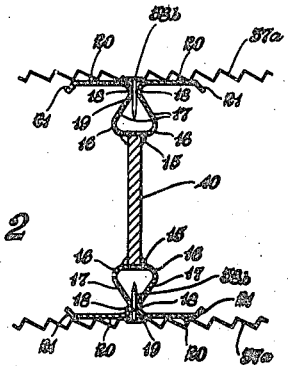
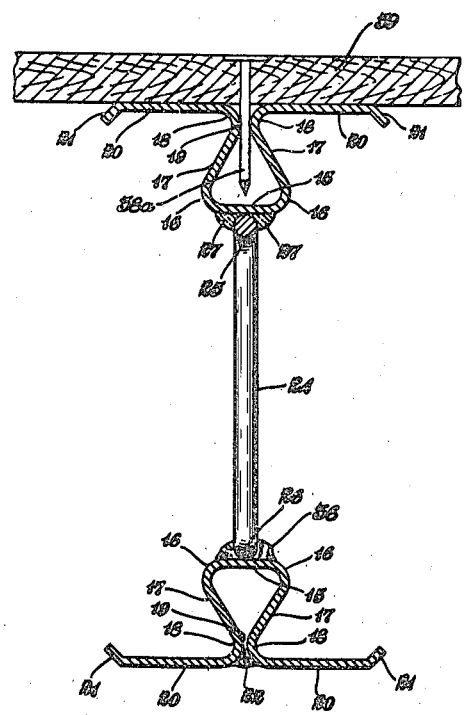
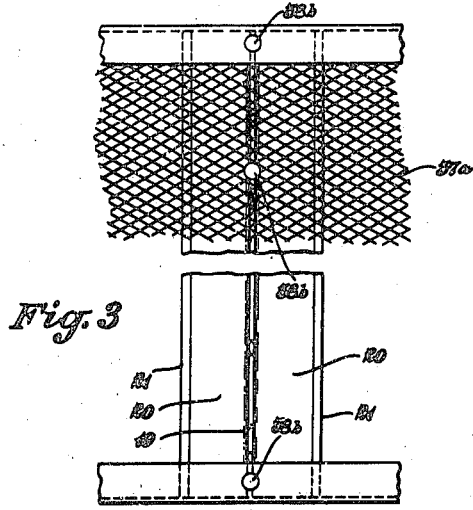
INVENTOR.
Stanley Macomber
BY
ATTORNEYS Dec. 28, 1948.                S. MACOMBER                 2,457,250
                       TUBULAR SECTION STRUCTURAL MEMBER
Filed May 3, 1948                                    3 Sheets-Sheet 2
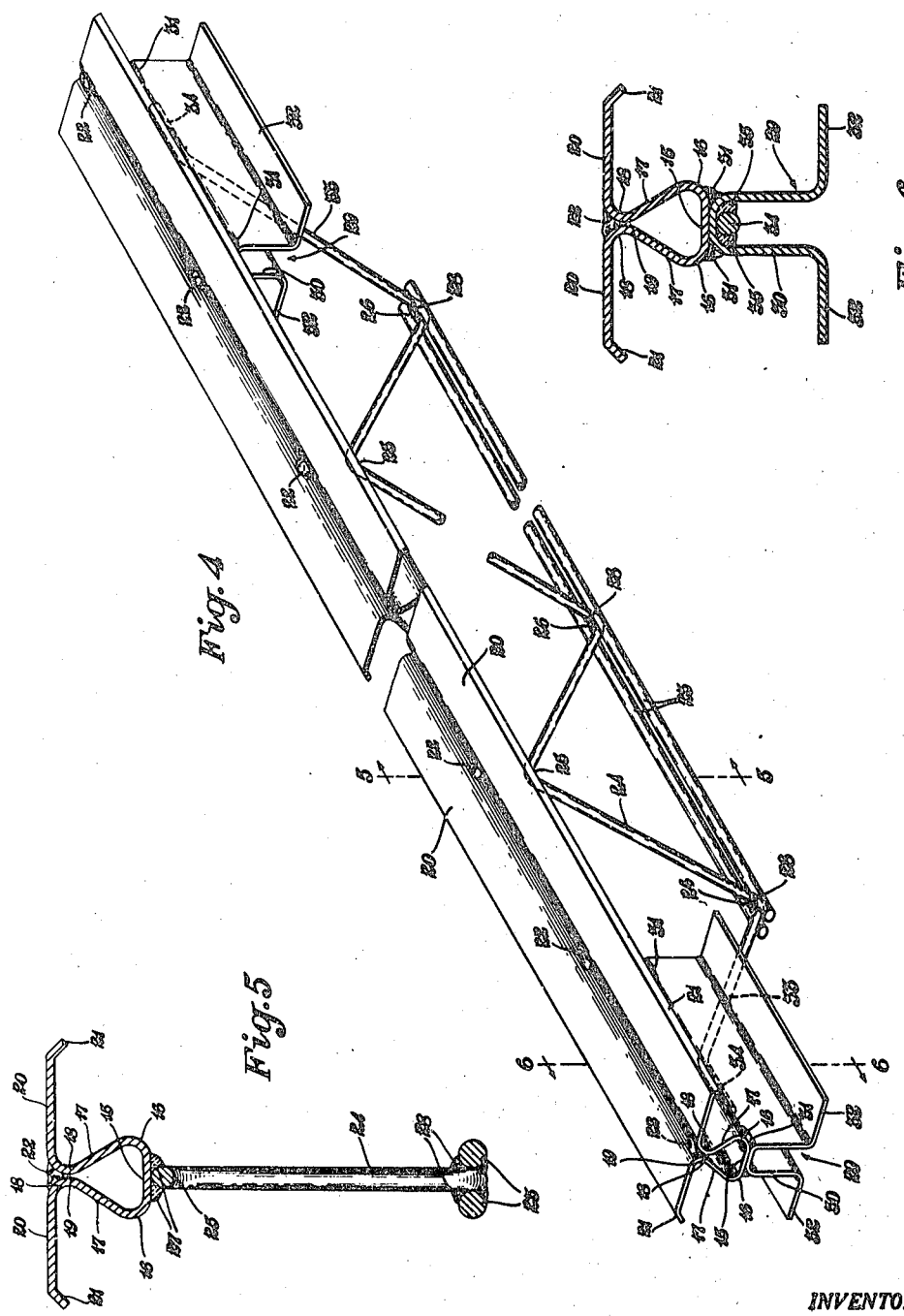
INVENTOR.
Stanley Macomber
BY
ATTORNEYS Patented Dec. 28, 1948

2,457,250

UNITED STATES PATENT OFFICE 2,457,250

TUBULAR SECTION STRUCTURAL MEMBER

Stanley Macomber, North Canton, Ohio

Application May 3, 1948, Serial No. 24,749

9 Claims. (Cl. 189—37)

The invention relates to structural members, and more particularly to a tubular section structural member, formed of a strip or sheet of steel of suitable gauge and dimensions to meet various requirements, and the present application is a continuation in part of my pending application, Ser. No. 640,820, filed January 12, 1946, which application was a continuation in part of my earlier application, Ser. No. 582,490, filed March 3, 1945 and since abandoned.

In my pending application, above referred to, a V-section structural member is disclosed, formed from a strip or sheet of steel, aluminum, copper, magnesium or other metal bent into substantially tubular, V-shape, having a longitudinal slot, or groove, to receive and retain nails, screws, or other fastening means, each bend in the structural member, particularly those forming said groove, being made upon a substantial radius.

These bends are of such proportions that, regardless of the thickness of the metal used in the manufacture of the structural member, the outside radius of each bend is considerably more than twice the thickness of the metal, thus not only providing the maximum compression value in the structural member when used as the top chord of a joist, or when carrying a load when used as studs for walls or partitions, but also providing substantial surfaces at opposite sides of the slot, or groove, to more effectively facilitate the entrance of nails, screws or other fastening devices into the groove, and to more effectually grip and retain said fastening devices, as well as providing greater strength and rigidity in the section for maintaining a given width of slot, or groove, and obviating any spring or give in the same when nails, screws or other fastening devices are driven therein.

The effectiveness of the nailing slot or groove, depends not only upon the strength and rigidity of the metal forming the walls of the slot, or groove, and holding the width of the slot and groove to a definite spacing narrower than the diameter of the nails, screws or other fastening means so as to scrape the sides of the fastening members as they are driven into place to be positively gripped and he'd in the slot, but also to the rounding of the side walls of the groove, or slot, so as to guide the nails, or other fastening devices, into the slot, or groove, causing them to be properly centered therein even though the fastening device may be started considerably out of line with the slot.

This may be accomplished by bending the metal upon a considerable radius at each side of the groove or slot, the radius being greater than twice the thickness of the metal from which the structural member is formed, and by holding the width of the slot or groove to a definite spacing by welding or riveting at intervals whereby the portions of the slot, or groove, between the welded or riveted points are substantially rigid so as to prevent spread and assure alignment.

It is also desirable in order to produce the most satisfactory results, that the cross section of the structural member be such that in all cases the height thereof is less than the over-all width, and that every bend in the structural member be upon a radius greater than twice the thickness of the metal, so as to give the greatest strength and rigidity to the structural member.

It is therefore an object of the invention to provide a structural member of simple and inexpensive construction, formed from a single strip or sheet of metal which may be rolled to any size requirement.

Another object is to provide structural members of various tubular cross sections in which the same relationship between the thickness of the metal and the radius of each bend is maintained.

A further object is the provision of a tubular structural member of the character referred to in which the width of the structural member is greater than its height.

A still further object is to provide such a structural member which may be economically produced from one of the most inexpensive forms of raw steel strips, or aluminum copper, magnesium or other metal.

Another object is the provision of a V-section structural member in which the metal is placed where the requirement is the greatest.

Still another object is the provision of a structural member which provides maximum efficiency with a minimum amount of metal.

A further and very important object of the invention is to provide a structural member so constructed that it provides a nailing groove, or slot, rigidly held to uniform width throughout, to which accessory material such as wood flooring, metal lath, plaster board or the like may be securely attached by nails, screws or other fastening means.

Still another object of the invention is to provide a V-section structural member for use as the top chord of a fabricated steel joist, which permits the use of longer panels thus reducing the number of bends in the web member of the joist.

A further object is to provide a top chord for fabricated steel joists which gives greater lateral stiffness in the joists and provides means for attaching floor boards or the like thereto.

A still further object is the provision of a top chord of this character which reduces the weight of the joist for the same carrying capacity.

Another object of the invention is to provide a one-piece top chord for a fabricated steel joist.

Still another object is to provide a structural member which may be used for both top and bottom chords in a fabricated joist.

A further object of the invention is to provide a tubular, or V-section, member having a nailing slot, or groove, the walls of which are rigid and held to definite spacing less than the diameter of the nails or other fastening devices to be driven therein.

A still further object is to provide such a structural member in which the walls of the nailing slot, or groove, present substantial surfaces to grip and retain the nails or other fastening devices driven into the slot.

Another object is to provide such a structural member in which the walls of the nailing slot or groove are formed upon a considerable radius, being more than twice the thickness of the metal, whereby nails, screws or other fastening devices will be guided into the slot or groove even though they be started at a point considerably to one side or the other of the slot or groove.

A further object is to provide such a structural member which is adapted for use as studding in a wall or partition.

The above objects together with others which will be apparent from the drawings and following description, or which may be later referred to, may be attained by rolling or otherwise forming a structural member from a single sheet or strip of steel, aluminum, copper, magnesium or other metal, of indefinite length and uniform cross section, in the manner hereinafter described in detail and illustrated in the accompanying drawings, in which:

Figure 1 is a fragmentary, perspective view of a V-section structural member, constructed in accordance with the invention;

Fig. 2 a transverse section through a studding formed from the V-section structural member shown in Fig. 1, showing the manner in which metal lath or the like may be attached thereto;

Fig. 3 a side elevation of the structure shown in Fig. 2;

Fig. 4 a perspective view of a fabricated steel joist in which the improved V-section structural member is used as a top chord;

Fig. 5 a transverse section through the fabricated steel joist, taken as on the line 5—5, Fig. 4.

Figure 10:
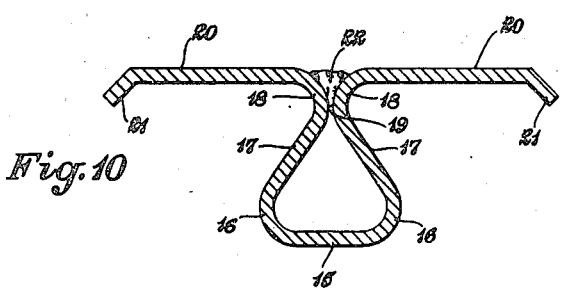
Figure 12:
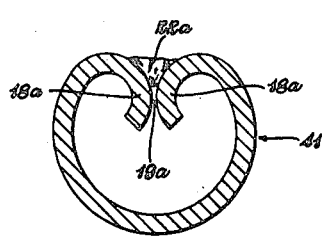
Figure 11:
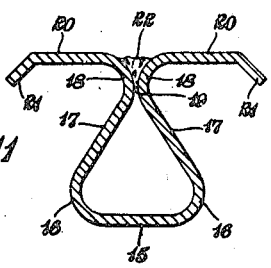
Figure 13:
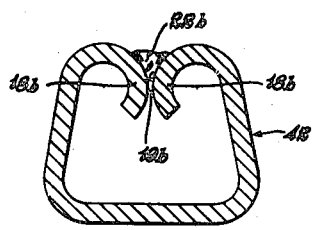
Figure 14:
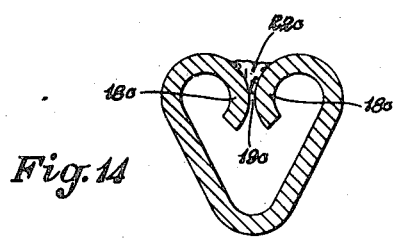

Fig. 6 a transverse section through the bearing portion at one end of the joist, taken as on the line 6—6, Fig. 4;

Fig. 7 a fragmentary, transverse sectional view of the upper portion of a floor joist embodying the invention, showing the manner in which metal lath, or the like, may be attached thereto;

Fig. 8 a transverse section through a fabricated metal joist wherein both the top and bottom chords comprise the improved V-section structural member, showing the manner in which a wood sub-floor may be attached to the top chord by nails or the like;

Fig. 9 a transverse sectional view through a V-section structural member formed of very heavy gauge material;

Fig. 10 a similar view of a V-section structural member formed of medium gauge material;

Fig. 11 a similar view of a V-section structural member formed of thin gauge material;

Fig. 12 a transverse sectional view through a structural member of substantially round, or circular, cross section and embodying the invention;

Fig. 13 a similar view of a structural member of substantially rectangular cross section; and Fig. 14 a similar view of a structural member of a substantially triangular cross section.

The structural member to which the invention pertains may be rolled or otherwise formed from a strip, or sheet, of steel of indefinite length and of desired gauge and width, to form structural members of various cross sections as shown in the drawings.

Referring first to the V-section structural member best shown in Figs. 1 and 9 to 11, the central portion of the strip is formed to substantially an inverted V or triangle, comprising the flat bottom wall 15, connected through the curved bends 16 at each side with the upwardly converging, substantially flat side walls 17, having the spaced, oppositely curved, rounded bends 18 at the apex of the V or triangle to form a central, longitudinal slot 19 at the top of the member, the metal being then bent outwardly in opposite directions from the slot forming the oppositely disposed lateral, flat flanges 20, located in a plane parallel with the flat bottom wall 15, the terminal edges of the flanges 20 being preferably bent at an angle, as indicated at 21, to stiffen and reinforce the structural member.

It is important that the round bends in the structural member, and more especially the bends indicated at 18 forming the walls of the slot or groove 19, be formed upon a considerable radius which, as shown in the drawings, is in all cases more than twice the thickness of the metal, regardless of the gauge of the steel strip or sheet from which the structural member is formed. It should also be noted that in all cases the overall width of the structural member is greater than the height.

For the purpose of holding the width of the slot, or groove, 19 to a definite spacing, as well as to assist in stiffening and reinforcing the member and holding it rigidly in this position, the slot, or groove, 19 may be welded or riveted at spaced intervals, as indicated at 22.

In cases where this V-section structural member is used as the top chord of a fabricated steel joist, these welded or riveted points may be coincident with the panel points of the joist, as will be later pointed out.

Although the improved structural member is adapted for use in a number of different structural units, it is illustrated in Figs. 4 to 8 of the drawings and described in detail herein, as comprising the top chord of a fabricated steel joist.

As best shown in Fig. 4, the joist includes generally the top chord, formed of a V-section, structural member constructed in the manner above described, two parallel straight bars or rods 23 that compose the bottom chord, and another bar or rod 24 constituting the web member of the joist and being bent reversely to form a successive series of oppositely directed V's, the upper angles 25 of which are connected to the V-section, top chord and the lower angles 26 of which are located between and connected to the bars or rods 23, forming the lower chord of the joist.

As shown in the drawings, the upper angles 25 are connected along the longitudinal center of the bottom wall 15 as by welding indicating at 27, the panel points thus formed being preferably coincident with the welds 22 in the nailing slot or groove 19 of the V-section top chord. The lower angles 26, which are located between the spaced chord bars 23, are welded thereto as indicated at 28.

A bearing plate, indicated generally at 29, may be connected to each end portion of the top chord, this bearing plate being rolled, or otherwise formed, from a sheet or strip of steel of desired gauge and width, and it comprises the central, inverted channel portion 30, attached to the bottom wall 15 of the V-section top chord as by welding indicated at 31, and the out-turned, horizontal flanges 32 at each side of the channel portion.

Upwardly and outwardly bent portions 33 of the web rod 24 are provided with the outwardly disposed, horizontal, terminal portions 34, which are received within the inverted channel portions 30 of the bearing plates and welded thereto as indicated at 35.

These bearing plates may be of any desired length and furnish means of support for the entire joist, so that the actual point of support may be located at any place along the bearing plates.

Although the improved V-section, structural member is shown, and above described, as used only as a top chord for a fabricated steel joist, it should be understood that an inverted V-section structural member may be substituted for the bars or rods 23, comprising the lower chord, such V-section member being welded to the lower angles 26 of the web rod, as indicated at 36, to form a lower chord for the joist as illustrated in Fig. 8.

The V-section structural member, when used as a top chord for a joist, has many advantages over the ordinary type of joists in which the top chord is composed of two spaced bars or rods between which the upper angles of the web are located and connected.

The V-section structural member has considerably more strength and rigidity than the rods or bars, permitting the use of longer panels and thus reducing the number of bends in the web, and it also gives greater lateral stiffness to the joist and reduces the weight of the joist for the same carrying capacity, and furthermore provides a nailing groove, or slot, to which material, or accessory items, such as wood flooring, metal lath, plasterboard and the like, may be securely nailed or connected by suitable attaching devices.

In Fig. 7 is shown the manner in which metal lath, or similar material, as indicated at 37, may be attached to the V-section, top chord of the steel joist by means of nails, or the like, as indicated at 38, driven through the metal lath and into the nailing slot or groove 19.

For this purpose the nails, screws or other fastening devices should be of slightly larger diameter than the width of the slot 19, so that the sides of the fastening devices are scraped, and scored or burred, as indicated in the drawings, as the nails or the like are driven into the slot, or groove, the curved walls 18 of which are held in definite spaced relation because of their cross sectional shape and the welds 22, so that there is no spring or give in the walls of the slot.

The nails, or other fastening devices, are thus held tightly in the slot or groove 19, of the V-section structural member so as to securely hold the metal lath, or other material, firmly in position upon the top chord of the joist.

As shown in Fig. 8, a wood, sub-floor 39 may be attached to the top chord in cases where the joist is used as a floor joist. The wood sub-floor rests upon the horizontal flanges 20 of the top chord and is securely attached thereto as by nails or other suitable fastening devices, indicated at 38a, these fastening devices being of sufficient length to be driven entirely through the wood sub-floor and a substantial distance into the nailing slot, or groove 19.

It should be understood that these nails, or other fastening devices, should be of greater diameter than the width of the slot so as to securely fasten the wood sub-floor to the joist in the same manner as the metal lath above described.

It will be seen that because of the considerable radium upon which each of the bends 18 is formed, a nail, screw or the like, used for attaching a sub-floor, metal lath or the like, may be driven down toward the V-section structural member at a point considerably upon either side of the center and will be guided down into the groove, or slot 19 by means of these arcuate bends 18, thus insuring a tight connection between the sub-floor, metal lath or the like and the top chord of the joist.

In Figs. 2 and 3 is shown the manner in which the improved V-section structural member may be used as a bearing stud for walls or partitions. For this purpose two of the V-section structural members are located in desired spaced relation to each other with their bottom walls 15 opposed, and strips 40 of steel or the like are interposed between, and welded to, the spaced V-section members, and metal lath, plaster board or the like, as indicated at 37a may be attached to each V-section member, as by nails 38b or the like, providing a hollow wall through which conduits, pipes and the like may be located.

Although the invention is illustrated in Figs. 1 to 11, and above described, as applied to a substantially V-section structural member, it should be understood that various other cross sectional shapes of structural members, embodying the invention, may be formed from a single sheet or strip of metal.

In Figs. 12 to 14 are shown a few modified cross sectional shapes of structural members, each having arcuate walls for the nailing grooves, or slots, which may be welded or riveted at intervals in the manner above described.

For instance, in Fig. 12 is shown a substantially circular or round, cross section of a structural member, indicated at 41, formed from a single strip or sheet, of steel of desired gauge and width, having its terminal edges bent arcuately, as at 18a, forming side walls for the nailing groove, or slot, 19a which may be welded together at intervals as indicated at 22a.

In Fig. 13 is shown a substantially square cross sectional shape of tubular structural member, indicated generally at 42, the terminal edges of which are bent to arcuate form, as indicated at 18b, forming the side walls for the nailing slot, or groove, 19b which may be welded at intervals as indicated at 22b.

In Fig. 14 is shown a substantially triangular cross section, the terminal edges of the strip or sheet being bent arcuately, as at 18c, forming curved side walls for the nailing groove, or slot, 19c, which is welded at intervals as indicated at 22c.

It will be seen that in each of these forms the nailing groove, or slot, is formed by two arcuate walls bent upon a radius greater than twice the thickness of the metal, in the same manner as the V-section structural member shown in Figs.

1 to 11, so that all of the advantages of the V-section, as above pointed out, may be attained with the other cross sectional shapes, each of which may be used in the same manner as the V-section structural member.

It should be noted that in each of the cross sectional shapes of structural member illustrated and described, the cross sectional width of the structural member is greater than its height.

From the above it will be evident that the improved structural member is adapted for use in various types of structural units, providing a simple, inexpensive and efficient construction which may be economically produced and which provides a maximum of strength with a minimum amount of metal, while the rigid, curved walls of the nailing groove, or slot, are held to a definite spacing, providing a nailing groove, or slot, to which accessory material or items may be easily and quickly secured and rigidly held by the use of ordinary nails, screws or other fastening devices of greater diameter than the width of the nailing slot.

I claim:

1. A structural member comprising a single piece of sheet metal of indefinite length and uniform cross section, longitudinally bent into tubular form with a longitudinal groove of predetermined definite width in one side thereof, opposite side portions of the sheet metal being arcuately bent to form the walls of said groove, and welds at spaced points in the entrance to the groove for rigidly holding the walls thereof to a predetermined definite spacing.

2. A structural member comprising a single strip of metal having its longitudinal central portion bent into tubular form with a longitudinal groove of predetermined definite width in one side thereof, the edge portions of the strip being oppositely bent on each side of the groove forming substantially flat flanges, the strip being curved between each wall of the groove and the adjacent flange, and welds at spaced points in the entrance of the groove for rigidly holding the walls thereof to a predetermined definite spacing.

3. A structural member comprising a single strip of metal having its longitudinal central portion bent into substantially triangular form with a longitudinal groove of predetermined definite width at the apex thereof, the edge portions of the strip being oppositely bent on each side of the groove forming substantially flat flanges, the strip being curved between each wall of the groove and the adjacent flange and welds at spaced points in the entrance of the groove for rigidly holding the walls thereof to a predetermined definite spacing.

4. A structural member comprising a single piece of longitudinally bent sheet metal of indefinite length and uniform cross section, said cross section comprising the base and sides of a triangle to provide a longitudinally extending cell of triangular cross section, the piece of metal having outwardly bent extensions at the apex of the triangle parallel with the base, whereby the structural member has two parallel opposed faces and interconnecting diagonal elements, the strip being curved between each side of the triangle and the adjacent extension, the contiguous portions of the member being spaced apart providing a groove of predetermined definite width along the apex of the triangle, the groove being welded at spaced points to prevent spreading and insure alignment of the walls of the groove to a predetermined definite spacing.

5. A fabricated steel joist including a top chord comprising a structural member formed of a single strip of metal having its longitudinal central portion bent into tubular form with a longitudinal groove of predetermined definite width in one side thereof, the edge portions of the strip being oppositely bent on each side of the groove forming substantially flat flanges, the strip being curved between each wall of the groove and the adjacent flange, welds at spaced points in the groove for rigidly holding the walls thereof to a predetermined definite spacing, a bottom chord spaced below the top chord and a reversely bent web member connected to both chords.

6. A fabricated steel joist including a top chord comprising a structural member formed of a strip of metal having its longitudinal central portion bent into triangular form with a narrow groove at the apex thereof, the edge portions of the strip being oppositely bent on each side of the groove forming substantially flat flanges, a bottom chord spaced below the top chord and a reversely bent web rod connected at spaced points to the bottom chord and to the bottom wall of the triangular portion of the top chord and a bearing plate at each end of the top chord, each bearing plate having a central, inverted channel portion connected to the lower wall of the triangular portion of the top chord, the opposite ends of the web rod being located within said inverted channel portions and connected thereto.

7. A fabricated steel joist including a top chord comprising a structural member formed of a strip of metal having its longitudinal central portion bent into triangular form with a narrow groove at the apex thereof, said groove being welded together at spaced points, the edge portions of the strip being oppositely bent on each side of the groove forming substantially flat flanges, the terminal edges of the flanges being angularly bent, a bottom chord spaced below the top chord and a reversely bent web rod connected at spaced points to the bottom chord and to the bottom wall of the triangular portion of the top chord, and a bearing plate at each end of the top chord, each bearing plate having a central, inverted channel portion connected to the lower wall of the triangular portion of the top chord, the opposite ends of the web rod being located within said inverted channel portions and connected thereto.

8. A fabricated steel joist including a top chord comprising a structural member formed of a strip of metal having its longitudinal central portion bent into substantially triangular form with a narrow groove at the apex thereof, each corner of the triangle being rounded, the edge portions of the strip being oppositely bent on each side of the groove forming substantially flat flanges, a bottom chord spaced below the top chord, a reversely bent web rod connected at spaced points to the bottom chord and to the bottom wall of the triangular portion of the top chord, and a bearing plate at each end of the top chord, each bearing plate having a central inverted channel portion connected to the lower wall of the triangular portion of the top chord, the opposite ends of the web rod being located within said inverted channel portions and connected thereto and outturned flat flanges on each side of the channel portion.

9. A fabricated steel joist including a top chord comprising a structural member formed of a strip of metal having its longitudinal central portion bent into substantially triangular form with a narrow groove at the apex thereof, each corner of the triangle being rounded, said groove being welded together at spaced points whereby the walls of the groove are rigidly held to a definite spacing, the edge portions of the strip being oppositely bent on each side of the groove forming substantially flat flanges, a bottom chord spaced below the top chord, a reversely bent web rod connected at spaced points to the bottom chord and to the bottom wall of the triangular portion of the top chord, each bearing plate having a central inverted channel portion connected to the lower wall of the triangular portion of the top chord, the opposite ends of the web rod being located within said inverted channel portions and connected thereto and outturned flat flanges on each side of the channel portion.

STANLEY MACOMBER.

REFERENCES CITED

The following references are of record in the file of this patent:

UNITED STATES PATENTS

| Number | Name | Date |
|---|---|---|
| 717,923 | Rapp | Jan. 6, 1903 |
| 1,778,337 | Pratt | Oct. 14, 1930 |
| 1,812,055 | Maher | June 30, 1931 |
| 1,863,257 | Tashjian | June 14, 1932 |
| 1,880,453 | Kantzler | Oct. 4, 1932 |
| 1,909,930 | Ridder | May 23, 1933 |
| 2,147,965 | Clauss | Feb. 21, 1939 |
| 2,184,113 | Calafati | Dec. 19, 1939 |